(12) United States Patent
Reich et al.

(10) Patent No.: US 10,173,340 B2
(45) Date of Patent: Jan. 8, 2019

(54) PROCESSING METHOD AND PROCESSING APPARATUS FOR COATING A SURFACE PORTION

(71) Applicant: HOMAG HOLZBEARBEITUNGSSYSTEME GMBH, Schopfloch (DE)

(72) Inventors: Klaus Reich, Lossburg (DE); Stefan Friese, Pfalzgrafenweiler (DE); Martin Gringel, Strassberg (DE)

(73) Assignee: Homag Holzbearbeitungssysteme GmbH, Schopfloch (DE)

( * ) Notice: Subject to any disclaimer, the term of this patent is extended or adjusted under 35 U.S.C. 154(b) by 242 days.

(21) Appl. No.: 15/122,250

(22) PCT Filed: Mar. 5, 2015

(86) PCT No.: PCT/EP2015/054616
§ 371 (c)(1),
(2) Date: Aug. 29, 2016

(87) PCT Pub. No.: WO2015/132339
PCT Pub. Date: Sep. 11, 2015

(65) Prior Publication Data
US 2016/0368162 A1   Dec. 22, 2016

(30) Foreign Application Priority Data
Mar. 5, 2014   (DE) .......................... 10 2014 204 005

(51) Int. Cl.
*B27D 5/00* (2006.01)
*B29C 63/00* (2006.01)
(Continued)

(52) U.S. Cl.
CPC ............. *B27D 5/003* (2013.01); *B27D 5/006* (2013.01); *B29C 63/003* (2013.01); *B32B 21/06* (2013.01);
(Continued)

(58) Field of Classification Search
CPC ......... Y10T 156/1034; Y10T 156/1348; Y10T 156/1788; B27D 5/003; B29C 63/003
(Continued)

(56) References Cited

U.S. PATENT DOCUMENTS

2004/0011460 A1* 1/2004 Such ...................... B27D 5/003
156/324
2011/0183122 A1* 7/2011 Schumacher .......... B27D 5/003
428/192

FOREIGN PATENT DOCUMENTS

DE   3821467 A1   12/1989
DE   4025596 A1   2/1992
(Continued)

OTHER PUBLICATIONS

International Search Report and Written Opinion dated May 21, 2015 with respect to international application No. PCT/EP2015/054616—cited only for references that are disclosed therein.
(Continued)

*Primary Examiner* — Carson Gross
(74) *Attorney, Agent, or Firm* — Scott R. Cox

(57) ABSTRACT

A method for coating a surface portion of a plate-like workpiece with a coating material is disclosed, wherein the workpiece is formed at least partially of wood, wood materials, plastic materials and the like, wherein the method includes coating the surface portion of the workpiece with a coating material by use of a coating unit, wherein the surface portion is formed in a coating direction with an angle that changes with respect to the plane of the workpiece at an
(Continued)

angle of $0°<\alpha<90°$ with respect to the plane, and has a curvature in the coating direction, and mechanically adjusting the coating unit during processing such that the position of the coating unit with respect to that part of the surface portion that is currently being processed is constant. Also disclosed is an apparatus having a control device for carrying out this method.

4 Claims, 2 Drawing Sheets

(51) Int. Cl.
    *B32B 21/06*     (2006.01)
    *B32B 21/08*     (2006.01)
    *B32B 37/00*     (2006.01)
    *B32B 37/06*     (2006.01)
    *B32B 37/22*     (2006.01)

(52) U.S. Cl.
    CPC .......... *B32B 21/08* (2013.01); *B32B 37/0046* (2013.01); *B32B 37/06* (2013.01); *B32B 37/22* (2013.01); *Y10T 156/1034* (2015.01); *Y10T 156/1348* (2015.01); *Y10T 156/1788* (2015.01)

(58) Field of Classification Search
    USPC .................................................. 156/523, 574
    See application file for complete search history.

(56) References Cited

FOREIGN PATENT DOCUMENTS

| | | |
|---|---|---|
| DE | 20 2010 009174 U1 | 11/2011 |
| EP | 0583753 A1 | 2/1994 |
| EP | 2332718 A2 * | 6/2011 ............ B27D 5/003 |
| EP | 2332718 A2 | 6/2011 |
| EP | 2345518 A1 | 7/2011 |
| EP | 2474398 A2 | 7/2012 |
| EP | 2732911 A2 | 5/2014 |

OTHER PUBLICATIONS

Priority Search Results dated Feb. 26, 2015 with respect to priority application No. DE 10 2014 204 005.1—cited only for references that are disclosed therein.

* cited by examiner

| Winkel | Angle |
| --- | --- |
| C-Achse | C axis |
| A-Achse | A axis |
| Zeit | Time |

PROCESSING METHOD AND PROCESSING APPARATUS FOR COATING A SURFACE PORTION

TECHNICAL FIELD

The present invention relates to a method and an apparatus for coating a surface portion, in particular a narrow surface portion, of a plate-like workpiece with a coating material, wherein the workpiece is preferably formed at least in sections of wood, wood-based materials, plastics material or the like, in accordance with the preamble of claim 1.

PRIOR ART

Methods and apparatuses for coating a narrow surface of a plate-like workpiece with a coating material are known to the applicant, wherein the narrow surface to be coated is arranged at an angle in relation to the plane of the plate, i.e. at an angle that is not 90°, or is arranged to be perpendicular, i.e. at an angle of 90°, and has a curvature in the direction of the narrow surface of the workpiece.

For example, EP 2 332 718 A2 relates to a 5-axis processing center with a gluing unit which can be positioned by means of three translational axes and two rotational axes at a desired inclination to a narrow surface of a workpiece to be coated.

Furthermore, EP 2 474 398 A2 shows a processing center for processing plate-like workpieces with an edging unit which is swivel-mounted about an axis parallel to the plane of the workpiece such that a narrow surface at an inclination in relation to the plane of the plate can be coated with a coating material.

However, what is common to the apparatuses and methods in the prior art is that they have limited coating possibilities.

DESCRIPTION OF THE INVENTION

It is therefore the object of the present invention to provide a method and an apparatus with which a greater variety of surfaces, in particular narrow surfaces, of a plate-like workpiece can be coated.

According to the invention, this object is achieved by a method according to claim 1 and an apparatus according to claim 6. Particularly preferred embodiments of the invention are described in the dependent claims.

The invention is based on the idea that the limited coating possibilities of the methods and apparatuses in the prior art are primarily due to the fact that these do not facilitate or provide for a continuous adjustment of the coating unit during the coating process.

Thus, according to the invention a method is provided for coating a surface portion, in particular a narrow surface portion, of a plate-like workpiece with a coating material, wherein the workpiece is preferably formed at least in sections of wood, wood-based materials, plastics material or the like, the method comprising the step of coating the surface portion with the coating material with a coating unit, wherein the surface portion is formed in the coating direction at an angle that changes in relation to the plane of the plate, or at an angle $0°<|\alpha|<90°$ with respect to the plane of the plate, and has a curvature in the coating direction. The coating unit is mechanically adjusted during processing such that the coating unit has a constant position in relation to the part of the surface portion being processed.

This method according to the invention provides not previously known coating possibilities. For instance, surfaces, in particular narrow surfaces, of a plate-like workpiece having an orientation that changes along the surface, can be coated continuously, i.e. in particular in one operation, with a coating material. The coating of shapes, i.e. three-dimensional structures, such as recessed grips, is also possible. The large number of coating possibilities of the method according to the invention is thereby facilitated above all by a coating in three dimensions being made possible. For example, three-dimensionally configured narrow surfaces of plate-like workpiece can be coated in this way. The coating of arcuate surfaces of plate-like workpieces, i.e. of surfaces having a curvature in the direction of extension, and which are arranged at an angle in relation to the plane of the plate, is also made possible with the method according to the invention. An arrangement at an angle in relation to the plane of the plate will be understood according to the invention as an inclination of the surface in relation to the plane of the plate at an angle of $0°<|\alpha|<90°$. In the scope of the present invention, the angle of inclination of a surface in relation to the plane of the plate relates to the actual angle, i.e. the direction of inclination is irrelevant.

The method according to the invention opens up completely new business areas to the applicant. For instance, a narrow surface formed according to aesthetic considerations can be coated with this method. The coating can therefore be used as a design element. Moreover, the design of a narrow surface is no longer subject to technical realization restrictions. This is particularly advantageous for individualization in the furniture industry. For example, with the present invention a cupboard with handleless doors can be provided, in which coated recessed grips are provided along the narrow surface of the workpiece.

Preferably, the surface portion to be coated has in the coating direction an angle that changes in relation to the plane of the plate and a curvature. This embodiment has the advantage that additional coating possibilities are facilitated.

The coating material can be applied to the surface portion to be coated at least in sections to excess. This has the advantage that the coating material extends along the entire height of the surface portion also in inclined sections of the surface portion to be coated. Thus, the height, and in this case it is the height of the surface portion to be coated in the plane of the surface portion that is meant, depends on the angle of inclination of the surface portion in relation to the plane of the plate. In a further step, the protrusion of the coating material that may be present in relation to the top side and/or underside of the plate can subsequently be face-milled.

In a further preferred embodiment, the coating material and/or the workpiece is heated before, during and/or after coating. Heating has the advantage that the coating material can be deformed easily and without damage being caused, primarily also in the direction of the height extension thereof, such that a simple and high-quality coating also of three-dimensional surfaces, in particular narrow surfaces, is made possible.

The coating unit may have a power source that is preferably selected from a laser source, an LED source, a hot air source, an ultrasound source, a UV source, a microwave source, an infrared source and a plasma source.

Furthermore, the present invention provides an apparatus for carrying out at least one embodiment of the method described above. According to the invention, this apparatus comprises an apparatus for carrying out the method according to one of the preceding claims, comprising a coating unit for coating a surface portion, in particular a narrow surface portion, of a plate-like workpiece with a coating material, a device for moving the coating unit in at least one translational direction and swiveling the coating unit so as to be parallel and/or perpendicular to the plane of the plate, and a control device configured to swivel the coating unit during coating so as to be parallel to the plane of the plate and/or perpendicular to the plane of the plate. With regard to the advantages of the apparatus, reference is made to the corresponding advantages of the method.

BRIEF DESCRIPTION OF THE DRAWINGS

FIG. 5 is coated.

DETAILED DESCRIPTION OF THE PREFERRED EMBODIMENTS

In the following, preferred embodiments of the present invention will be described with reference to the enclosed drawings. The embodiments described in the following can be combined wholly or in part in order to form further embodiments.

Figure 1:
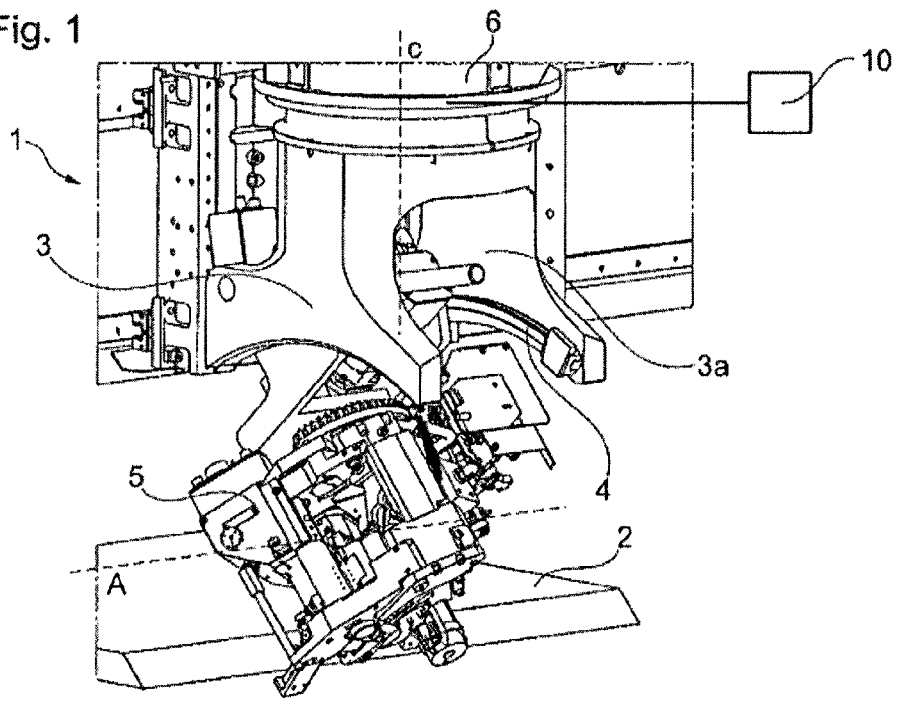
FIG. 1 shows a perspective view of a coating unit of a first embodiment of the present invention.
Figure 2:
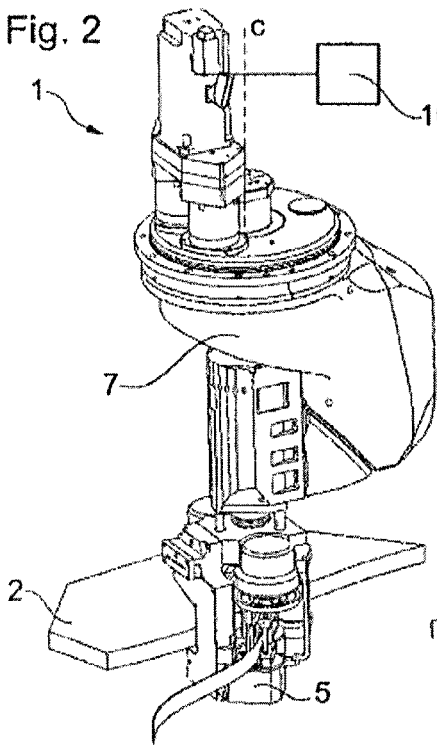
FIG. 2 shows a perspective view of a coating unit of a second embodiment of the present invention.
Figure 3:
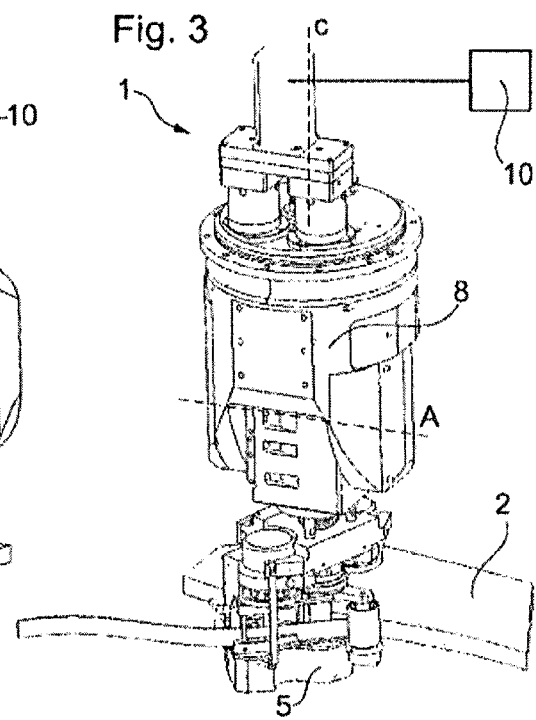
FIG. 3 shows a perspective view of a coating unit of a third embodiment of the present invention.

The preferred embodiments of the apparatus according to the invention as shown in FIG. 1 to FIG. 3 are preferably suitable for coating workpieces which are formed at least in sections of wood, wood-based materials, plastics material or the like, as used for example in the furniture and components industry. These may be, for example, solid wood boards or chipboards, light-weight boards, sandwich boards or the like.

The coating material is preferably an edge strip which can be formed of different materials such as synthetic veneer, paper, cardboard, metal etc. and various combinations thereof. The coating material is preferably provided in the form of a roll, but can also be provided in the form of individual sections, for example. Moreover, the coating material may have a functional layer which displays adhesive properties as a result of energy input (for example heating or radiation, such as laser radiation), such that the coating material can be joined to a workpiece via the functional layer. The functional layer may comprise means for improving thermal conductivity, such as polyolefins and/or metal particles. Furthermore, the functional layer may comprise absorbers for laser light or other radiation sources. Alternatively, the functional layer may also be applied separately between the coating material and the workpiece.

FIG. 1 shows a first preferred embodiment of the apparatus according to the present invention. The processing apparatus 1 shown in FIG. 1 is a processing center for coating workpieces 2. The apparatus 1 of the first preferred embodiment comprises a swivel device 3 with a guide housing 3a and a swivel guide 4 for guiding a swivel movement about a swivel axis A. A processing unit 5, in this case a coating unit, is positioned in the swivel guide 4 of the swivel device 3 such that this can be swiveled relative to the guide housing 3a. The swivel guide 4 is configured such that the swivel axis A does not go through the swivel guide 4; rather, it is arranged at a distance therefrom. Moreover, the swivel device 3 comprises a swivel drive for the swivel movement of the coating unit 5. The swivel movement of the coating unit 5 takes place in the arcuate swivel guide 4, wherein the coating unit 5 can preferably be swiveled at an angle of +/−65° C. to the plane of the plate of the workpiece 2.

Furthermore, the processing apparatus 1 comprises a rotation device 6 for rotating the swivel device 3 together with the coating unit 5 about a rotational axis C, which is preferably arranged so as to be perpendicular to the swivel axis A. Preferably, the rotational axis C runs through the processing unit 5. The device also comprises a device for the translational movement of the swivel device 3 in all three spatial directions.

FIG. 2 and FIG. 3 show a second and third preferred embodiment of the present invention. The processing apparatuses 1 of these preferred embodiments are each configured as 5-axis processing centers. FIG. 2 shows a second preferred embodiment in which the 5-axis processing center 1 comprises a gimballed 5-axis head 7 to which a coating unit 5 is attached. The third preferred embodiment, which is shown in FIG. 3, comprises a Cartesian 5-axis head 8, to which a coating unit 5 is attached.

The coating unit 5 of the second and third preferred embodiments can be moved by means of the processing center in three translational spatial directions and can also be swiveled about two rotational axes. For example, the coating unit 5 of the Cartesian 5-axis head 8 can be swiveled about the axis C, which is preferably arranged so as to be perpendicular to the plane of the workpiece 2, and about the axis A, which is preferably arranged so as to be parallel to the plane of the workpiece 2.

What is common to all three embodiments of the present invention is that they comprise a control device 10. The control device 10 is configured to adjust the coating unit 5 along a narrow surface to be coated such that the unit has a constant position in relation to the portion of the workpiece being processed. In particular, the control device 10 is configured to facilitate this constant position even if the narrow surface portion to be coated of the workpiece 2 has an orientation that changes along the narrow surface 2. This change in orientation may be an angle of the narrow surface that changes in relation to the plane of the plate and/or a change in the curvature of the narrow surface in the direction of the narrow surface. In order to ensure a constant position of the coating unit 5 in relation to the portion to be coated of the workpiece 2 when there is a change in the curvature in the coating direction, i.e. in the direction of the narrow surface, the control device 10 is configured to rotate the coating unit 5 about the C axis during processing depending on the curvature. When the angle α of the narrow surface portion to be coated changes in relation to the plane of the plate, the control device 10 is configured for the first and third embodiment for example to swivel the coating unit 5 about the A axis during processing in accordance with the change in the angle of inclination. The control device 10 is preferably also configured to superimpose these movements. Moreover, the control device 10 is configured to perform these movements continuously, i.e. in one operation, without the apparatus 1 having to be stopped.

Figure 5:
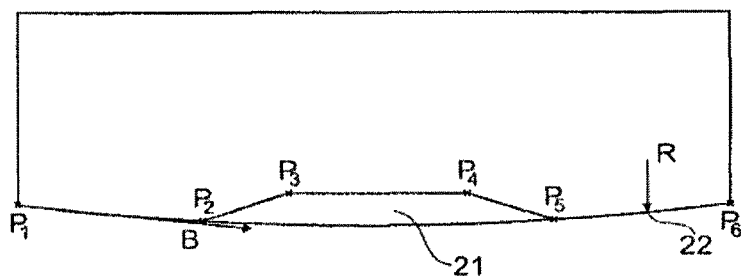
FIG. 5 shows a plan view of the exemplary component shown in FIG. 4.
Figure 6:
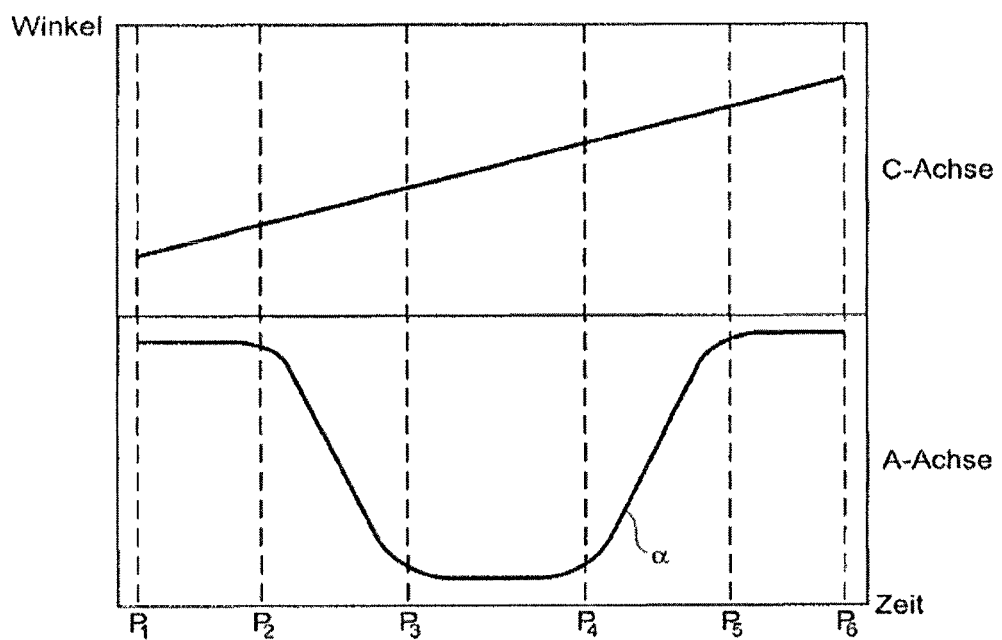
FIG. 6 is a time/angle diagram which shows the adjustment angle progress of the A and C axes of the apparatus shown in FIG. 3 when the narrow surface of the exemplary component shown in FIG. 4

A preferred embodiment of the method according to the invention will be described in the following with reference to FIG. 4 to FIG. 6. The apparatuses of the first to third embodiments as described above are all suitable for carrying out the method described below; however, in the following the method will be described based on the examples of the first and third preferred embodiments.

Figure 4:
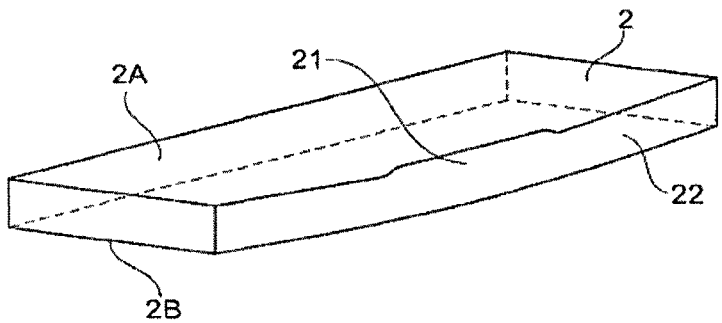
FIG. 4 shows a perspective view of an exemplary component which has been produced with the method according to the invention using an apparatus according to one of the preferred embodiments of the invention.

The workpiece 2 shown in FIG. 4, which has been coated with the method according to the invention, comprises a recessed grip 21, which is formed on a narrow surface 22 of the workpiece 2. Moreover, the workpiece plate 2 on the narrow surface 22 has a curvature in the coating direction B, i.e. along the narrow surface 22. To be more precise, the narrow surface 22 has a radius R, which is shown in FIG. 5, and therefore the narrow surface 22 is arcuate. The recessed grip 21 runs from the topside 2A of the plate, at which it extends into the workpiece 2 and is therefore moved back in relation to the radius R of the narrow side, to the underside 2B of the workpiece, at which it passes into the course of the narrow surface of the workpiece plate 2 and therefore follows the course of radius R of the narrow surface 22. In other words, the recess 21 does not extend into the workpiece plate 2 at the underside 2B of the workpiece. In this preferred embodiment, the recessed grip 21 is formed so as to be central on the narrow surface 22 of the workpiece 2. Accordingly, the narrow side 22 of the workpiece 2 has in the coating direction B an inclination a in relation to the plane of the plate which changes, and a curvature, an arch shape, in the direction of the narrow surface 22.

When coating the workpiece narrow surface 22, a coating material is applied to the portion of the narrow surface 22 being processed using the coating unit 5. The coating material is heated with a power source provided in the apparatus 1 prior to being joined to the narrow surface 22. Moreover, the coating material is supplied to excess.

The coating of the narrow surface 22 with the recessed grip 21 can be divided into five portions: P1 to P2, P2 to P3, P3 to P4, P4 to P5 and P5 to P6. The coating method steps of portion P1 to P2 are the same, with the exception of the directions of rotation of the individual axes of the apparatus 1, as those of portion P5 to P6, and the coating method steps of portion P2 to P3 are the same as those of portion P4 to P5, and therefore only the coating method steps of portions P1 to P2, P2 to P3 and P3 to P4 will be described here as examples.

To coat the narrow surface 22, the coating unit 5 is moved by the apparatus 1 along the narrow surface of the workpiece at a constant speed.

In the first portion P1 to P2 of the narrow surface 22 of the workpiece 2, the narrow surface 22 is arranged so as to be perpendicular to the plane of the plate 2 and only has a curvature, in this case a bend, in the coating direction B. In order to follow this bend and to bring the coating unit 5 into a constant position in relation to the portion to be processed of the narrow surface 22 during coating, the control device 10 gives control commands to the drive of the C axis of the apparatus 1 along the entirety of the first portion, such that the coating unit 5 is swiveled about the C axis at a constant speed and therefore the position of the unit 5 in relation to the workpiece portion to be coated is constant, cf. in this respect the time/angle diagram in FIG. 6.

In the second portion of P2 to P3, the narrow surface 22 has a continuous increase in the angle of inclination a of the narrow surface 22 in relation to the plane of the plate, wherein this also has the radius R in the coating direction B. Accordingly, the control device 10 also gives control signals as to the entirety of the portion to the drive of the C axis of the apparatus 1, such that the coating unit 5 also rotates about the C axis at a constant speed, in order to follow the curvature, i.e. the bend, of the part to be coated of the narrow surface 22 of the workpiece and in order to create a constant position between the unit 5 and the narrow surface 22. In addition, the control device 10 gives control signals to the drive of the A axis of the apparatus 1, such that the coating unit 5 additionally rotates about the A axis, in order to follow the increased inclination of the narrow surface 22 in relation to the plane of the plate 2 in this portion, cf. in this respect FIG. 6.

As soon as point P3 is reached, the narrow surface 22 has a constant inclination a in relation to the plane of the plate, but also has a curvature in the direction of the narrow surface, such that the control device 10 only gives control signals to the drive of the C axis along this third portion, so that the coating unit 5 has a constant position in relation to the narrow surface 22 during coating.

The coating of portions P4 to P5 and P5 to P6 takes place analogously to that of portions P1 to P2 and P2 to P3, with the exception of the directions of rotation of the A and C axes.

The invention claimed is:

1. A method for coating a surface portion of a plate-like workpiece with a coating material, wherein the workpiece is formed at least in sections of wood, wood-based materials, or plastics material, comprising the steps of:
    coating the surface portion of the workpiece with the coating material using a coating unit, wherein the surface portion has a curvature formed in a coating direction (B) and angle (α) that changes in relation to a plane of the workpiece, and
    adjusting the coating unit during processing such that the position of the coating unit in relation to a part of the surface portion being processed is constant.

2. The method according to claim 1, in which the coating material is coated onto the surface portion at least in sections to excess and further comprising face-milling the surface portion after coating.

3. The method according to claim 1, further comprising heating the coating material and/or the workpiece before, during and/or after coating.

4. The method according to claim 1 in which the coating unit has a power source that is selected from a group consisting of a laser source, an LED source, a hot air source, an ultrasound source, a UV source, an infrared source, a microwave source and a plasma source.

* * * * *